Sept. 1, 1931.  N. E. LINDENBLAD  1,821,386
ANTENNA
Filed Oct. 28, 1927    2 Sheets-Sheet 1

INVENTOR
NILS E. LINDENBLAD
BY
ATTORNEY

Sept. 1, 1931. N. E. LINDENBLAD 1,821,386
ANTENNA
Filed Oct. 28, 1927  2 Sheets-Sheet 2
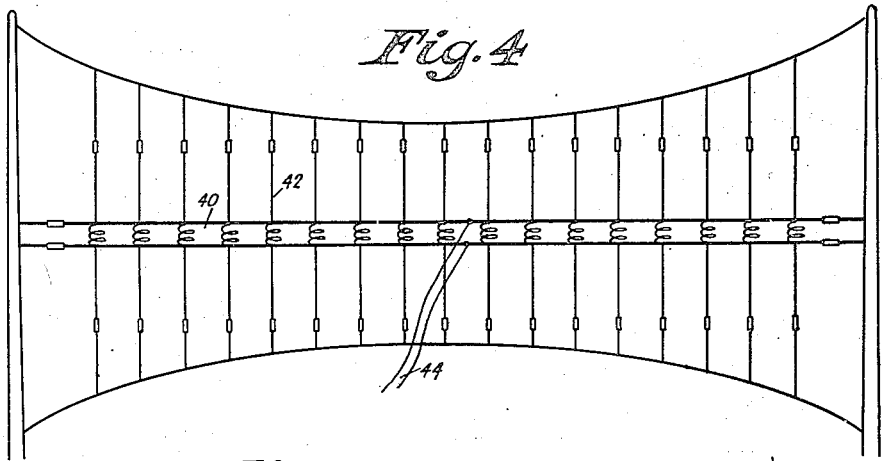
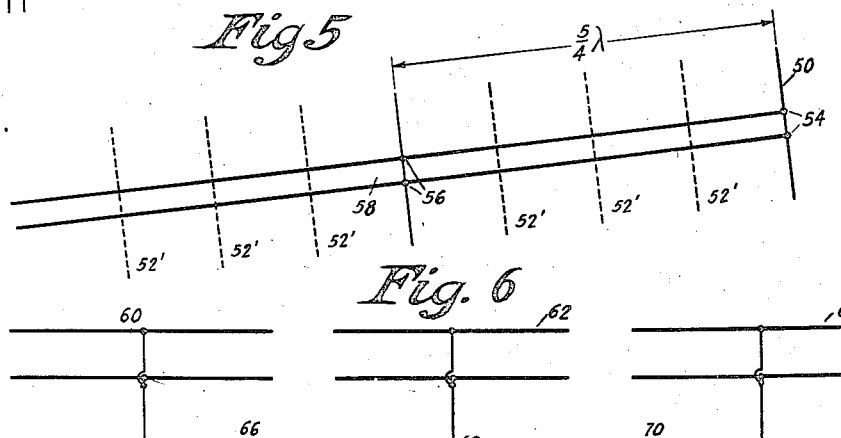
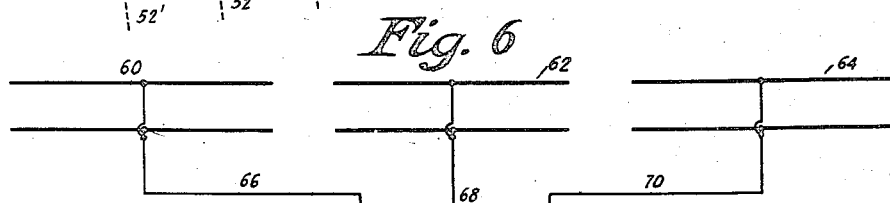
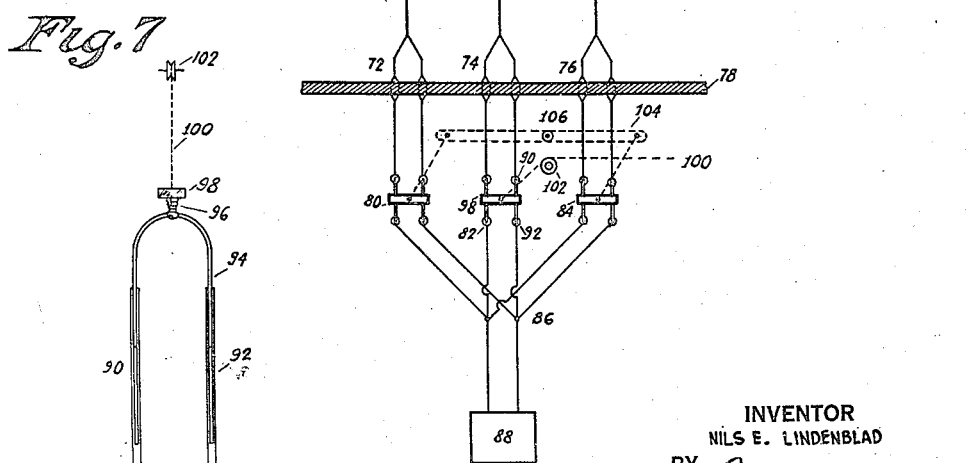
INVENTOR
NILS E. LINDENBLAD
BY
ATTORNEY Patented Sept. 1, 1931

1,821,386

UNITED STATES PATENT OFFICE

NILS E. LINDENBLAD, OF ROCKY POINT, NEW YORK, ASSIGNOR TO RADIO CORPORATION OF AMERICA, A CORPORATION OF DELAWARE

ANTENNA

Application filed October 28, 1927. Serial No. 229,407.

This invention relates to antennæ, and more particularly to directive antennæ of the extensive type.

In a copending application of Clarence W. Hansell, Serial No. 161,771 filed Jan. 18, 1927, there is disclosed a directive antenna for short waves modeled somewhat after a wave antenna, but having a large number of transverse radiators coupled between longitudinal feeder members in order to increase the radiation. This antenna is of the end-on type.

There also has been suggested and put into use directive antennæ of the broadside type wherein a plurality of radiators are located normally of the direction of transmission, and are excited cophaseally by means of a complex system of symmetrically branched feeder lines.

It is a primary object of my invention to improve such antennæ. The end-on antenna first mentioned is simple in structure, but I have improved it in operation. The broadside antenna next adverted to requires a complex structure, which I have greatly simplified by exciting the transverse radiators by a pair of linear feeder members, much as in the case of the end-on antenna, but arranged to feed energy at apparent infinite velocity.

It is clear that for antennæ of the type under consideration there must be accurate control of the velocity of energy transfer along the feeder members, for this is what determines the relative phase relations in the individual radiators which make up the antenna. The velocity on a transmission line may be determined by adjustment of the relative inductance and capacitance characteristics of the line, but in the case of an antenna the situation is complicated by the existance of a powerful space wave of radiated energy which reacts upon the line. Therefore in order to be able to govern the velocity it is essential that the wave on the feeder members be not predominated over by the wave in space, and to attain this is one object of my invention, which I accomplish by placing the feeder members relatively closly together and coupling the radiators transversely and externally to the feeder members, rather than between them. In this way the radiation from the transversals does not have to cross the feeder members, and meanwhile the relative capacitance of the line to that of the radiators is increased.

The effect of the space wave on the feeder members is further reduced by reducing the amount of energy tapped from the feeder members by the individual radiators. This reduction of attenuation may be obtained in several ways, for example, by decreasing the length of the radiators, so as to decrease their capacitance, or by decreasing the spacing and increasing the size of the feeder members in order to increase their capacitance, or by using limiting reactances, preferably small condensers, in series with the radiators, or even, tho less desirably, by increasing the spacing between successive radiators.

To control the velocity along the feeder members I employ transverse inductances which are internally coupled to the feeder members. Now the action of the feeder members may be further complicated by the fact that tapping energy from them serves to upset their smooth and uniform operation as a transmission line. In some cases each of the tapping points may act as a reflection point. To overcome this is a further object of my invention which I fulfill by employing, where necessary, a greater number of transverse velocity control inductances than there are transverse radiators.

For a desired degree of directivity there is a minimum length of extensive antenna system. In the case of the end-on antenna it is desirable that the attenuation or rate of withdrawal of energy from the feeder members be such that the energy therein is brought to zero at the end of the antenna. If the attenuation is too small there is energy left over at the end of the line which, unless absorbed, is reflected and causes standing waves, with attendant energy losses. In fact, reflected energy is energy transmitted in the opposite direction, which, of course, spoils the radiation pattern of the antenna, and is wasted. If the attenuation is too great energy radiated by the first portion of the antenna induces energy back into the latter portion of the antenna and standing waves may result. In any event, when the attenuation is too great only the first portion of the antenna is effective, and therefore the requirement of minimum length of extensive system is no longer fulfilled. It is therefore clear that accurate control of attenuation, as well as of velocity, is required, and to meet this requirement is a further object of my invention.

For this the expedients already suggested for limiting the withdrawal of energy by the radiators are perfectly suited, inasmuch as the natural rate of attenuation, in general, is too great.

I find that it is desirable to control what may be termed the focus of the transmitted beam, that is, the convergence or divergence of the propagated waves. This adjustment should be a variable, rather than a fixed quantity, and should be applicable to types of antennæ other than the broadside, and to permit these things is a further object of my invention. This I do by using sections of antenna which are located relatively in broadside, and by varying the phase relations of the sections symmetrically with respect to an axis in the direction of transmission. Thus, if three sections are employed, focusing is readily accomplished by varying the phase relation of the center section with respect to the outer two sections. The phase relation is most simply controlled by varying the effective length of the transmission line which energizes the center antenna section.

It has also been suggested to warp the directivity of antennæ having fixed directivities by varying their relative phase, and to provide means for accomplishing this, as well as focusing, is a still further object of my invention. For this purpose I insert sliding U shaped transmission line portions, somewhat in the form of the adjustable portion of a trombone horn.

The broadside antenna is bi-directional and to make it unidirectional is a further object of my invention. This I do by using a plurality of broadside antennæ positioned in the direction of transmission, and energizing the feeder members from a transmission line in the direction of transmission at the equivalent of the velocity of light, while energizing each of the broadside antennæ at infinite velocity. In simplest form there need be used only two broadside antennæ, placed in parallel relation a suitable distance apart, and in effect, the rear antenna is an energized reflector. In the simple case of two antennæ they should preferably be an odd number of quarter wave lengths apart, for complete cancellation, and to obtain directivity in elevation the distance should be made large rather than small, say five quarter wave lengths. Herein lies another advantage of the directly energized reflector, for a simple reflector must be kept near the antenna in order to operate effectively.

My invention is further described and further claimed in my copending companion application, Serial No. 229,408, filed on even date herewith, and in the following specification, which is accompanied by drawings in which Figure 1 is a fragment and explanatory of one form of antenna;

Figure 4 shows a broadside antenna with center coupling;

Figure 5 is an elevation of one end of a tilted broadside antenna equipped with an energized reflector;

Figure 6 indicates a plurality of antenna sections arranged for variable beam focus and directivity warping; and Figure 7 is a detail of means to adjust the transmission line lengths.

Figure 1:
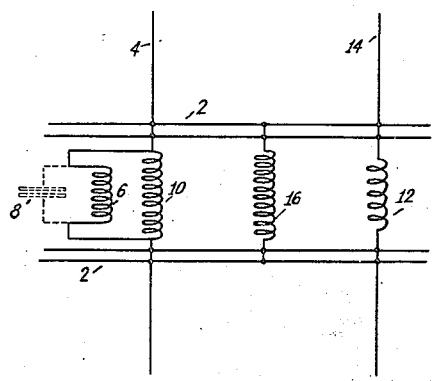

Referring to Figure 1 it is seen that the feeder members 2 are located relatively closely together, and that the radiators 4 and 14 are coupled transversely and externally to the feeder members, rather than between them. This change is exceedingly important for it results in that the radiation from the transversal does not have to cross and interlink with the feeder members. It also results in that because the feeder members are close together the region between them contains potential and magnetic lines of force which are normal, rather than curved, as seems to be the case when the feeder members are far apart, owing to the lag caused by the lower velocity of the lines of force in space. It also increases the capacitance of the feeder members, thereby helping the energy therein to predominate over the space wave.

To further increase the capacitance and decrease the surge impedance of the feeder members they may be enlarged in cross section, or several conductors may be used in parallel, as has been indicated in Figure 1. This procedure is beneficial, and if carried sufficiently far, may alone be used to obtain successful velocity control and proper attenuation. However, to solve the problem entirely by this expedient is structurally inconvenient and expensive, and it is much better to use a transmission line of more ordinary dimensions, and to limit the attenuation by other means.

In Figure 1 the radiators 4 and 14 have been shortened, physically, thus reducing their capacitance and their relative energy withdrawal. They may be considered as having been lengthened electrically so as to again bring them in tune by a fictitious inductance 6, which resonates with the natural capacitance of the radiator 8.

For velocity control transverse inductances are used. The velocity-reactance curve is similar to a curve of tangents, and, in the range in which I choose to work, a larger inductance connected across the line causes a smaller resultant velocity. A total absence of transverse connection is a case of infinite inductance, and therefore low velocity. To increase the velocity transverse inductances of finite size are connected across the line, and these may be decreased or increased in magnitude according as it is desired to increase or decrease the apparent velocity of energy flow on the line. By suitably choosing the inductances the velocity may be increased to apparent infinite velocity. The word "apparent" is inserted because it is impossible to really cause energy to flow along a line at an infinite velocity, in the transient state, but it is possible to have all parts of the line fluctuating cophaseally immediately after the transient state, which is apparent infinite velocity. Because of the nature of a curve of tangents, if the inductance is further decreased the velocity swings from infinity in one algebraic sense to infinity in the opposite algebraic sense, and thereafter becomes finite in decreasing values. This is pointed out because it explains why the adjustment for actually infinite velocity is exceedingly critical, whereas the adjustment for light velocity, as in an end-on antenna is much less so. With broadside antennæ it is preferable to use a velocity slightly less than infinite to make the operation more stable.

In Figure 1 the fictitious inductance 10 may be considered a velocity control inductance of proper magnitude to produce the desired velocity in the feeder members. It is clear that the fictitious parallel inductances 6 and 10 may be replaced by an equivalent inductance of lower reactance, such as the inductance 12 shown in series with the radiator 14. The radiator 14, loaded by the inductance 12, is detuned with respect to the transmission frequency.

The inductance 16 is a velocity control inductance located intermediate the radiators 4 and 14, and serves to improve the action of the feeder members as a transmission line, especially in such cases where the radiators are spaced at relatively greater intervals.

Figure 2:
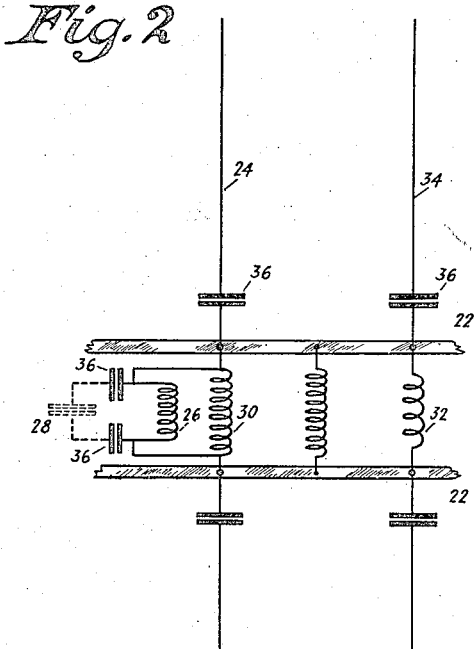
Figure 2 is a fragment and explanatory of another form of antenna.

Attention is now directed to Figure 2, in which there are feeder members 22, which may take the form of a copper strip, to which there are coupled transverse radiators 24 and 34, through small series condensers 36. The equivalent circuit consists of a fictitious tuning inductance 26, the natural capacitance of the radiators 28, and the series condensers 36. The reactance of the capacitive branch is governed mostly by that of the small series condensers. By coupling through these limiting reactances the capacitance of the radiators is lowered, and therefore they need not be physically decreased in length, and preferably may be increased. Decreasing the capacitance of the radiators by shortening them lessens their radiation resistance. By the expedient adopted in Figure 2 the radiation resistance not only need not be decreased but actually may be increased, and meanwhile the capacitance may be made any value desired. Increased radiation resistance, from a simpler aspect, means merely that the transversal is more efficiently a radiator which might be predicted from its greater length.

As in Figure 1 there is a fictitious velocity control inductance 30, and the parallel inductances 26 and 30 may be replaced by a single inductance 32. Also, if desired, additional velocity control inductances may be used.

Figure 3:
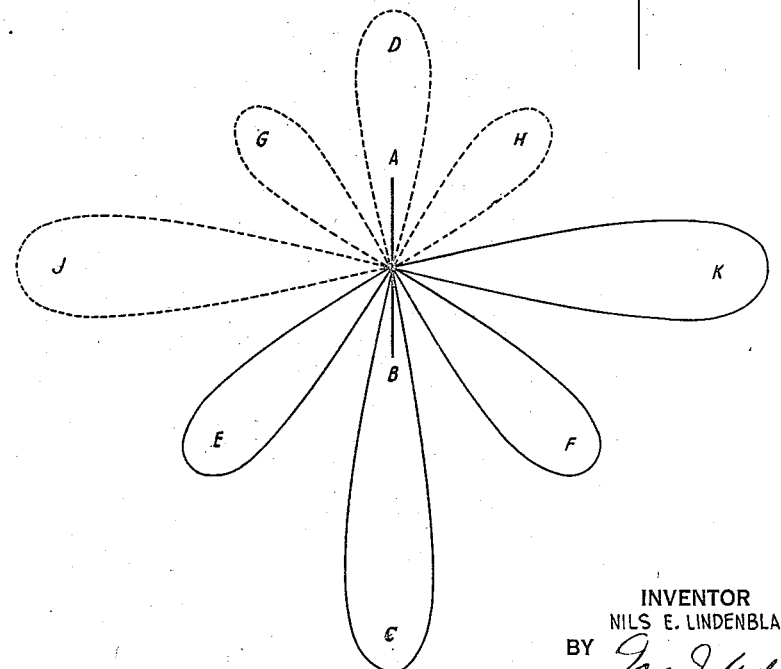
Figure 3 is a radiation pattern.

It is to be understood that the various features so far pointed out are equally applicable to end-on and broadside antenna systems. In its most general aspect my invention makes these systems alike, at least, in fundamentals. To explain this more clearly attention is directed to Figure 3, in which an extensive antenna system is indicated by the line AB. It is known that if the radiators along the antenna AB are excited cophaseally they radiate normally of the antenna, whereas if they are excited at phase displacements equal to those of the wave in space the antenna propagates energy along its length, and if the radiators are excited at phase displacements greater than those of the wave in space the antenna propagates energy in intermediate directions.

I excite the radiators from simple linear feeder members, and I obtain the desired phase displacements by causing the energy flow on the feeder members to dominate the space wave and by then controlling the velocity of energy flow along the feeder members to be that desired. It is clear that for end-on propagation the velocity should be that of light, for broadside propagation the velocity should be infinite, and for intermediate directions the velocity should be intermediate infinite velocity and that of light.

When feeding energy along the antenna in the direction from A to B at the velocity of light a radiation pattern is produced like that marked C. If the attenuation along the antenna is too small energy is left over at the end B, and is reflected, producing radiation in the opposite direction, marked D. There is no radiation at right angles because the standing wave produced by reflection, like the travelling wave before reflection, has successive portions along the antenna AB of opposite phase which neutralize one another.

If the velocity of flow along the feeder members from A to B is increased the radiation pattern C splits up into the patterns E and F, and reflection will cause additional lobes G and H.

If the velocity is made infinite the radiation patterns are J and K, which are equal. The reason for this is that apparent infinite velocity is produced by causing a standing wave of infinite length. To maintain the steady state full reflection and little attenuation are desired. In broadside propagation the lobe K is the merger of the lobes F and H, and therefore reflection is not at all undesirable. For unidirective propagation additional antennæ may be used to oppose and reflect the lobe J.

End-on propagation may be made unidirective by reducing the antenna energy to zero at B to prevent reflection, which requires attenuation control. This expedient is not suitable for a broadside antenna, yet with it, as well as with the end-on antenna, there must be attenuation control because the energy withdrawn by the individual radiators must be limited, lest the space wave adversely effect the wave on the feeder members.

In Figure 4 there is indicated a broadside antenna comprising the feeder members 40 to which there are coupled transverse radiators 42, and a transmission line 44. The feeder members and radiators may take the forms shown in Figures 1 or 2, and the values of the combined or separate velocity and tuning inductances are selected to obtain very slightly less than infinite velocity along the feeder members.

In Figure 5 there is indicated an end view of an antenna system the radiators 50 of which have been tilted away from the vertical so as to elevate the propagated wave. It will be understood that the radiator 50 and the feeder members 54 are an end view of an antenna such as has been indicated in Fig. 4, and proportioned and constructed as was explained in connection with Figs. 1 and 2. To obtain uni-directive transmission another similar complete antenna comprising the radiators 52 may be situated in back of the antenna, and the feeder members 54 and 56 of both of the antennæ may be energized from a transmission line 58, extending in the direction of transmission, as shown. With enough of these complete antennæ to obtain average cancellation, as indicated by the dotted lines 52′, the distance between these parallel antennæ is immaterial, providing that the phase change between them equals the phase displacement of the wave in space, which is most simply accomplished by making the velocity on the transmission line 58 extending in the direction of transmission between the feeder members 54 and 56, which extend at right angles to the direction of transmission, equal to the velocity of light. As shown, a minimum of two such antennæ may be used, in which case they should preferably be spaced an odd number of quarter wave lengths, for complete cancellation of energy in the undesired direction. With simple reflector wires, such as were formerly used, a space of only one quarter wave is preferable, in order to efficiently energize the reflector from the radiator. When using my type of directly energized reflector, which might more aptly be termed a director, the distance need not be so small, and I prefer to use a much greater spacing, for example, five quarter wave lengths, in order to give the antenna considerable directivity in elevation, which is a form of directivity which a broadside antenna usually lacks. The phase displacement may be obtained by means other than a light velocity transmission line, hence I shall describe this feed as being at the equivalent of the velocity of light.

In Figure 6 there is indicated a triple broadside antenna comprising the antennæ 60, 62 and 64, provided with suitable reflecting antennæ, all of which antennæ are constructed in accordance with the teachings laid down in connection with Figures 1, 2, 4, and 5, and which are energized from two wire transmission lines 66, 68 and 70, which are the analogues of transmission line 58 in Fig. 5. The lines 66 and 70 are made to differ in length from the line 68 by one or more whole wave lengths, so as to cause no phase changes in the energy fed to the antennæ 60, 62, and 64. The lines have been shown as a single line, for simplicity, but in reality are two wire transmission lines, as indicated at 72, 74 and 76, just before entry to the power house by way of insulators located in the wall 78. The lines lead to the trombone slides 80, 82 and 84, from which they are joined at 86 and lead to a transmitter 88.

The form of the adjustable trombone slides is indicated in Figure 7, in which it is seen that for each wire of the transmission line there are provided two vertical tubes 90 and 92, in which there slides a U shaped conductor 94. To prevent neutralizing inductive effects the spacing between the tubes 90 and 92 should be at least three times the spacing between the wires of the transmission line. The sliding portion 94 is fixed to an insulator 96 which is mounted on a block 98. For each transmission line there are two slides which are fixed to separate insulators 96 mounted upon a single block 98.

For focusing the transmitted beam the effective length of the transmission line to the center antenna must be varied, and this is accomplished by raising or lowering the block 98, which may be done by means of a cord 100 cooperating with a pulley 102. It is to be understood that for greater refinement more than three sections may be provided, in which case the phase changes should be symmetrical relative to the center of the system, which may be accomplished by the use of several cords such as the cord 100 which are wound upon drums of varying diameters fixed to a single shaft.

It will be appreciated that this method of focusing the transmitted beam is equally applicable to several end-on antennæ, as well as to broadside antennæ. The system comprises several directive antenna sections located relative to their direction of directivity in broadside, a branched transmission line system for feeding the section, and means to vary the phase relations of the sections symmetrically with respect to the direction of transmission in order to focus the transmitted energy.

The antennæ 60 and 64 need not necessarily be exactly in phase, for the focusing may equally well be accomplished when the outer two antennæ have been energized slightly differently in phase in order to warp their directivity, so long as the center antenna is altered in phase relative to both outer antennæ.

Warping of antenna directivity is not my invention, being disclosed and claimed in a copending application of C. W. Hansell Serial No. 229,294, filed on even date herewith, but my novel means for varying the length of a transmission line is equally well applicable to warping directivity as it is to focusing a transmitted beam. Thus, in Figure 6, it is only necessary to provide the transmission lines 72 and 76, as well as the line 74, with trombone slides 80 and 84, and to yoke these together by means of a lever 104 provided with a pivot 106 located above the center of the middle transmission line. Swinging of the lever 104 causes an unsymmetrical variation in phase which tends to warp the relative directivity. In this case also it is perfectly feasible to refine the equipment by the use of more than three sections, and numerous sections may be provided, each having a trombone slide, and all of these slides may be connected to a single swinging lever 104, movement of which will vary the phase relations of the sections in linear ratio, as is desired for warping the directivity.

It is difficult to construct the antenna so that it will come out in optimum adjustment for an exactly predetermined wave length. For adjustment after erection I prefer to slightly vary the spacing between the two conductors comprising each of the two feed lines shown in Figure 1. Strips with spacing bolts are employed, and this permits of a wave length adjustment of about a half meter, which is sufficient for corrective purposes.

I claim:

1. The method of focusing the emission from a directive antenna system comprising three sections located relatively in broadside which includes varying the phase relation of the center section with respect to the outer sections such that the phase difference between the center and the outer sections is substantially the same.

2. An extensive antenna system for transmitting electromagnetic waves through space comprising linear feeder members and a plurality of physically shortened radiators shortened relative to a half wave length at the operating frequency transversely and externally coupled thereto.

3. An extensive antenna system for transmitting electromagnetic waves through space comprising relatively closely spaced feeder members of low surge impedance, and a plurality of physically shortened radiators shortened relative to a half wave length at the operating frequency transversely and externally coupled thereto.

4. An extensive antenna system for transmitting electromagnetic waves through space comprising feeder members, a plurality of shortened radiators shortened relative to a half wave length at the operating frequency transversely and externally coupled thereto, and a plurality of velocity control inductances transversely and internally coupled thereto.

5. An extensive antenna system for transmitting electromagnetic waves through space comprising feeder members, a plurality of shortened radiators externally coupled thereto, a plurality of inductances internally coupled thereto in series with said radiators, said inductances being equivalent in magnitude to two parallel inductances which respectively tune the radiators and control the velocity of energy transfer along the feeder members.

6. A broadside extensive antenna system comprising feeder members extending normally of the direction of transmission, a plurality of radiators transversely and externally coupled thereto, and a plurality of velocity control and tuning inductances transversely and internally coupled thereto.

7. A broadside extensive antenna system comprising feeder members extending normally of the direction of transmission, a plurality of radiators transversely and externally coupled thereto, a plurality of velocity control and tuning inductances transversely and internally coupled thereto, and a transmission line coupled to the feeder members at their midpoint.

8. A broadside extensive antenna system comprising a plurality of pairs of feeder members extending normally of the direction of transmission, a plurality of radiators transversely and externally coupled thereto, a plurality of velocity control and tuning inductances transversely and internally coupled thereto for causing substantially apparent infinite velocity of energy transfer along the pairs of feeder members, and a transmission line supplying energy to the feeder members in the direction of transmission at the equivalent of the velocity of light.

9. A broadside extensive antenna system comprising two pairs of feeder members extending normally of the direction of transmission and spaced an odd plurality of quarter wave lengths apart, a plurality of radiators transversely and externally coupled thereto, a plurality of velocity control and tuning inductances transversely and internally coupled thereto for causing substantially apparent infinite velocity of energy transfer along the pairs of feeder members, and a transmission line for supplying energy to the feeder members.

10. A broadside extensive antenna system comprising feeder members extending normally of the direction of transmission, in azimuth, a plurality of radiators similarly tilted away from the vertical, in elevation, transversely and externally coupled thereto, and a plurality of velocity control and tuning inductances transversely and internally coupled thereto.

11. A broadside extensive antenna system comprising a plurality of pairs of feeder members extending normally of the direction of transmission, in azimuth, a plurality of radiators similarly tilted away from the vertical, in elevation, transversely and externally coupled thereto, a plurality of velocity control and tuning inductances transversely and internally coupled thereto for causing substantially apparent infinite velocity of energy transfer along the pairs of feeder members, and a transmission line supplying energy to the feeder members in the direction of transmission at the equivalent of the velocity of light.

12. A broadside extensive antenna system comprising two pairs of feeder members extending normally of the direction of transmission, in azimuth, and spaced an odd plurality of quarter wave lengths apart, a plurality of radiators similarly tilted away from the vertical, in elevation, transversely and externally coupled thereto, a plurality of velocity control and tuning inductances transversely and internally coupled thereto for causing substantially apparent infinite velocity of energy transfer along the pairs of feeder members, and a transmission line supplying energy to the feeder members.

13. A unidirective antenna system for elevated radiation comprising a broadside antenna, a broadside reflecting antenna located an odd plurality of quarter wave lengths therefrom and at an altitude lower than that of the antenna, and means for directly energizing both the reflecting antenna and the antenna.

14. A directive antenna system comprising a plurality of sections located relatively in broadside, each section comprising a plurality of radiators lying in one plane, a branched transmission line system for feeding the sections, and means to vary the phase relations of the sections symmetrically with respect to the direction of radiant action in order to focus the transmitted energy.

15. A directive antenna system comprising three sections located relatively in broadside, means to feed the outer sections in a desired phase relation, and means to feed the center section in variable phase relative to both the outer sections in order to focus the transmitted energy.

16. A directive antenna system comprising three sections located relatively in broadside, a branched transmission line for feeding the outer sections in a desired phase relation, and a transmission line of variable effective length relative to the effective length of the branched transmission line for feeding the center section in variable phase relative to the outer sections.

17. A directive antenna system having three sections each comprising a plurality of pairs of feeder members extending normally of the direction of transmission, a plurality of radiators transversely and externally coupled thereto, a plurality of velocity control and tuning inductances transversely and internally coupled thereto for apparently causing substantially infinite velocity of energy transfer along the pairs of feeder members, and a transmission line supplying energy to the feeder members in the direction of transmission at the equivalent of the velocity of light; means to feed the transmission lines of the outer sections in a desired phase relation; and means to feed the transmission line of the center section in variable phase relative to both the outer sections in order to focus the transmitted energy.

18. In combination, a transmission line and a trombone slide for varying the electrical length of said transmission line comprising two parallel conducting members and a U shaped conductor in sliding contact therewith.

19. A directive antenna system comprising a plurality of antennæ located relatively in broadside, a source of transmission energy, branched transmission lines for feeding the antennæ, and means in the form of trombone slides connected in series with the transmission lines for varying their effective length in order to adjust the phase relations of the antennæ.

20. A directive antenna system comprising a plurality of directive antennæ having fixed directivities located relatively in broadside, a source of transmission energy, branched transmission lines for feeding the antennæ from the source, a plurality of variable transmission line portions in the form of trombone slides connected in series with the transmission lines, and means to vary the setting of the slides unsymmetrically in linear relation in order to warp the resultant direction of propagation.

21. A directive antenna system comprising a plurality of directive antennæ having fixed directivities located relatively in broadside, a source of transmission energy, branched transmission lines for feeding the antennæ from the source, a plurality of variable transmission line portions in the form of trombone slides connected in series with the transmission lines, and means to vary the setting of the slides symmetrically in linear relation in order to focus the propagated energy.

22. A directive antenna system comprising a plurality of directive antennæ having fixed directivities located relatively in broadside, a source of transmission energy, branched transmission lines for feeding the antennæ from the source, a plurality of variable transmission line portions in the form of trombone slides connected in series with the transmission lines, means to vary the setting of the slides unsymmetrically in linear relation in order to warp the resultant direction of propagation, and means to vary the setting of the slides symmetrically in linear relation in order to focus the propagated energy.

23. An extensive antenna system comprising feeder members of relatively large cross section which are relatively closely spaced, and a plurality of radiators transversely and externally coupled thereto.

24. An extensive antenna system comprising feeder members of low surge impedance relatively closely spaced, and a plurality of radiators of low capacitance transversely and externally coupled thereto.

25. An extensive antenna system comprising feeder members of relatively large cross section and of low surge impedance, a plurality of radiators transversely and externally coupled thereto, and a plurality of velocity control inductances transversely and internally coupled thereto.

26. An extensive antenna system comprising feeder members, a plurality of radiators transversely and externally coupled thereto, and a greater number of velocity control inductances transversely and internally coupled thereto.

27. An extensive antenna system comprising feeder members, a plurality of radiators transversely and externally coupled thereto, and inductances internally coupled thereto in series with said radiators, said inductances being equivalent in magnitude to two parallel inductances which respectively tune the radiators and control the velocity of energy transfer along the feeder members.

28. A uni-directive antenna system comprising broadside antennæ spaced apart an odd plurality of quarter wave lengths, each antenna comprising simple linear transmission lines having externally and symmetrically coupled thereto, linear radiators and, means for coupling high frequency apparatus to a transmission line to at least one of said antennæ.

29. A uni-directive antenna system comprising broadside antennæ spaced apart an odd plurality of quarter wave lengths, each antenna comprising simple linear transmission lines having externally and symmetrically coupled thereto linear radiators; and, a transmission line coupling the two antennæ adapted to have electrical energy transferred therealong at the speed of light.

NILS E. LINDENBLAD.